United States Patent
Mann

(10) Patent No.: US 6,405,917 B1
(45) Date of Patent: Jun. 18, 2002

(54) WELDING HEAD FOR A LOOPING MACHINE

(75) Inventor: Matthias Mann, Bayreuth (DE)

(73) Assignee: SMB Schwee Maschinenbau GmbH, Goldkronach (DE)

( * ) Notice: Subject to any disclaimer, the term of this patent is extended or adjusted under 35 U.S.C. 154(b) by 0 days.

(21) Appl. No.: 09/635,855

(22) Filed: Aug. 11, 2000

(30) Foreign Application Priority Data

Aug. 11, 1999 (DE) .......................... 199 37 828

(51) Int. Cl.[7] .......................... B23K 37/04; B65B 13/24
(52) U.S. Cl. .................. 228/5.7; 228/44.3; 100/33 PB
(58) Field of Search ............................. 228/144, 146, 228/147, 5.7, 44.3, 49.1; 156/137, 157, 580, 583.1; 100/26, 33 PB; 53/399

(56) References Cited

U.S. PATENT DOCUMENTS

| | | | |
|---|---|---|---|
| 3,561,350 A | * | 2/1971 | Dorney et al. |
| 3,648,739 A | * | 3/1972 | Angarola |
| 3,654,033 A | * | 4/1972 | Angarola et al. |
| 3,984,278 A | * | 10/1976 | Styner et al. |
| 4,050,372 A | * | 9/1977 | Kobiella |
| 4,139,145 A | * | 2/1979 | Moore |
| 4,272,314 A | * | 6/1981 | Banai |
| 4,313,779 A | * | 2/1982 | Nix |
| 4,357,186 A | * | 11/1982 | Calvert |
| RE31,353 E | * | 8/1983 | Cheung |
| 4,850,179 A | * | 7/1989 | Takami |
| 5,234,154 A | * | 8/1993 | Kajiwara et al. |
| 5,267,508 A | * | 12/1993 | Yoshino |
| 5,614,057 A | * | 3/1997 | Conley, Jr. et al. |
| 5,996,314 A | * | 12/1999 | Pennini et al. |
| 6,053,387 A | * | 4/2000 | Garbotz et al. |
| 6,079,650 A | * | 6/2000 | Scaglia |
| 6,085,487 A | * | 7/2000 | De Vlaam |

FOREIGN PATENT DOCUMENTS

| | | |
|---|---|---|
| DE | 297 16 896.7 | 11/1997 |
| DE | 297 16 897.5 | 11/1997 |
| DE | 297 16 898.3 | 11/1997 |
| DE | 29621737 U1 * | 4/1998 |

* cited by examiner

Primary Examiner—Tom Dunn
Assistant Examiner—Kiley Stoner
(74) Attorney, Agent, or Firm—Browdy and Neimark, P.L.L.C.

(57) ABSTRACT

A welding head for looping machine is provided with a strap guide (7) for passing the looping strap (5) through the welding head (1), a strap fixing element (14) for holding the lapping strap sections (3, 4) which are to be welded together, a welding set (17) for melting the looping strap sections (3, 4) which are to be welded together, a pressing arrangement for joining the melted strap sections (3, 4) which are to be welded together, and a mechanically operating ejector (30) which is integrated in the welding head (1) for lifting the welded looping strap (5) out of the welding head (1).

12 Claims, 2 Drawing Sheets

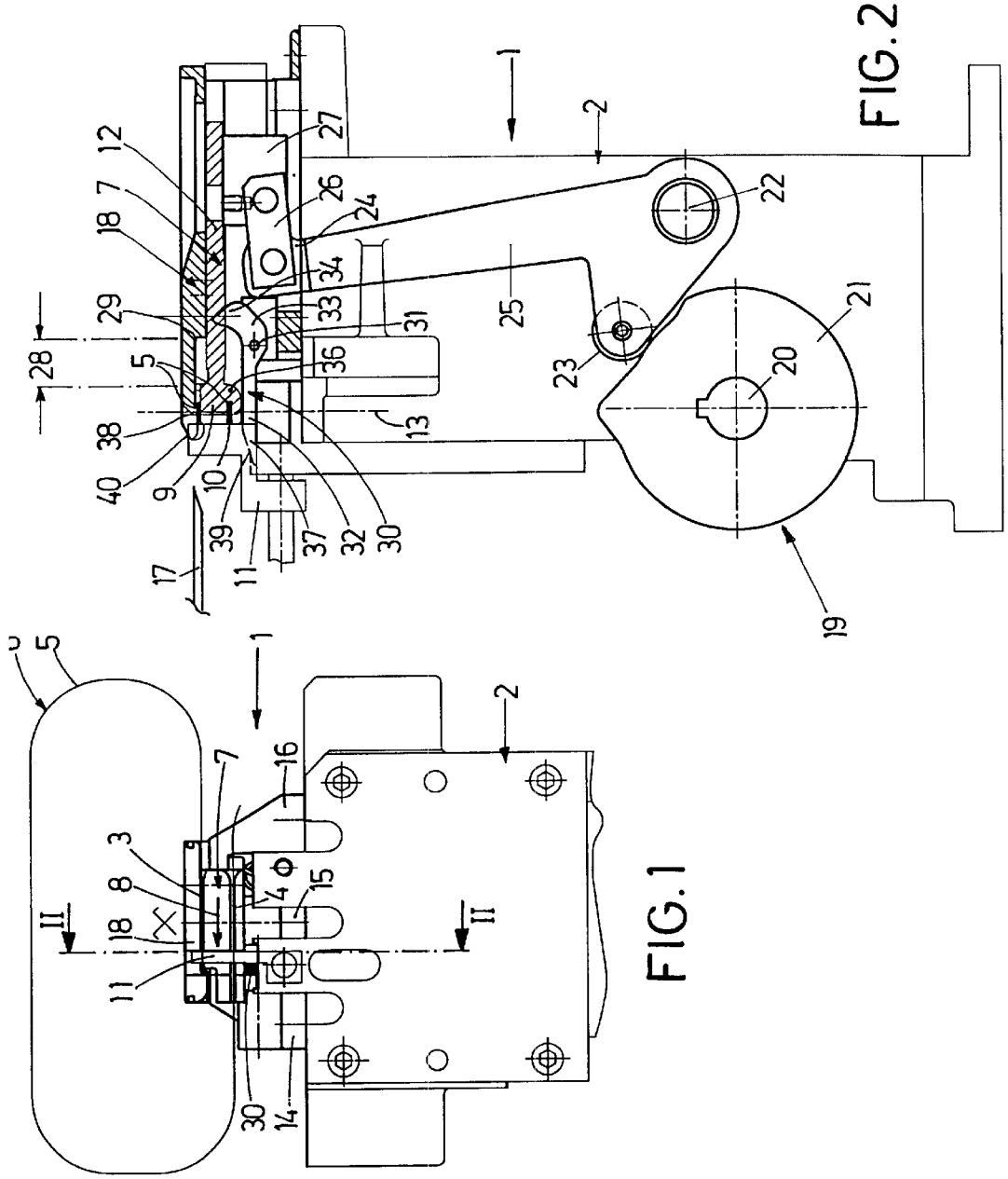

WELDING HEAD FOR A LOOPING MACHINE

BACKGROUND OF THE INVENTION

1. Field of the Invention

The invention relates to a welding head for a looping machine.

2. Background Art

Welding heads of the generic type come in various designs. Parts common to these welding heads are a strap guide passing the looping strap through the welding head, a strap fixing element holding the lapping strap sections which are to be welded together, a welding set melting the strap sections to be welded together, and a pressing arrangement joining the melted strap sections which are to be welded together. Examples of welding heads of the species are illustrated in German utility models DE 297 16 896 U1, DE 297 16 897 U1 and DE 297 16 898 U1.

When thin unstable stacks of, for instance, printed matters are looped, loading the product stack is possible only to a very restricted extent—if possible at all—because otherwise the stack would wave or fold. In this regard, the looping machine can operate only at a very restricted loop tensioning force. Since, owing to its instability, the product to be looped hardly offers any resistance to the tensioning of the strap, there is no stretching of the looping strap itself. This means that no contraction forces are inherently available in the strap, as a result of which the lapping and welded strap sections in the welding head will not come out of the welding head by themselves by the portion of the strap where the loop is closed. The noose of the strap possesses too low an elasticity of its own to enable the closed portion of the strap to come out of the welding head.

To solve these problems, actuation of the looping strap by compressed air has been proposed, the strap thus being blown out of the welding head. The air jets needed to this end are disposed beside the welding head or incorporated therein, which is accompanied with considerable constructional requirements.

The compressed air supply means necessary in this design causes additional expenditure for the supply infrastructure of a looping machine equipped with such a welding head. Very often, compressed air supply is not even available.

SUMMARY OF THE INVENTION

Proceeding from these problems, it is an object of the invention to embody a welding head for a looping machine which can be employed universally and without compressed air supply means and which reliably enables the welded strap sections to come out of the welding head.

This object is attained by an ejector of mechanical operation which is integrated into the welding head, lifting the welded looping strap out of the welding head.

Because of the mechanical characteristics of the ejector, compressed air supply means can be omitted. This also implies reduced noise pollution during operation of the machine, because a mechanical ejector can work by far more quietly than hissing compressed air jets. Finally, from aspects of construction and control technique, a mechanical ejector is by far more easily to be put into practice and works more reliably.

Preferred embodiments of the looping machine and details of an exemplary embodiment of the invention will become apparent from the ensuing description, taken in conjunction with the annexed drawings.

BRIEF DESCRIPTION OF THE DRAWING

FIG. 1 is a diagrammatic lateral view of a welding head with the ejector in its normal position;

FIG. 2 is a section through the welding head on the line II—II of FIG. 1; and

DESCRIPTION OF THE PREFERRED EMBODIMENT

Figure 4:
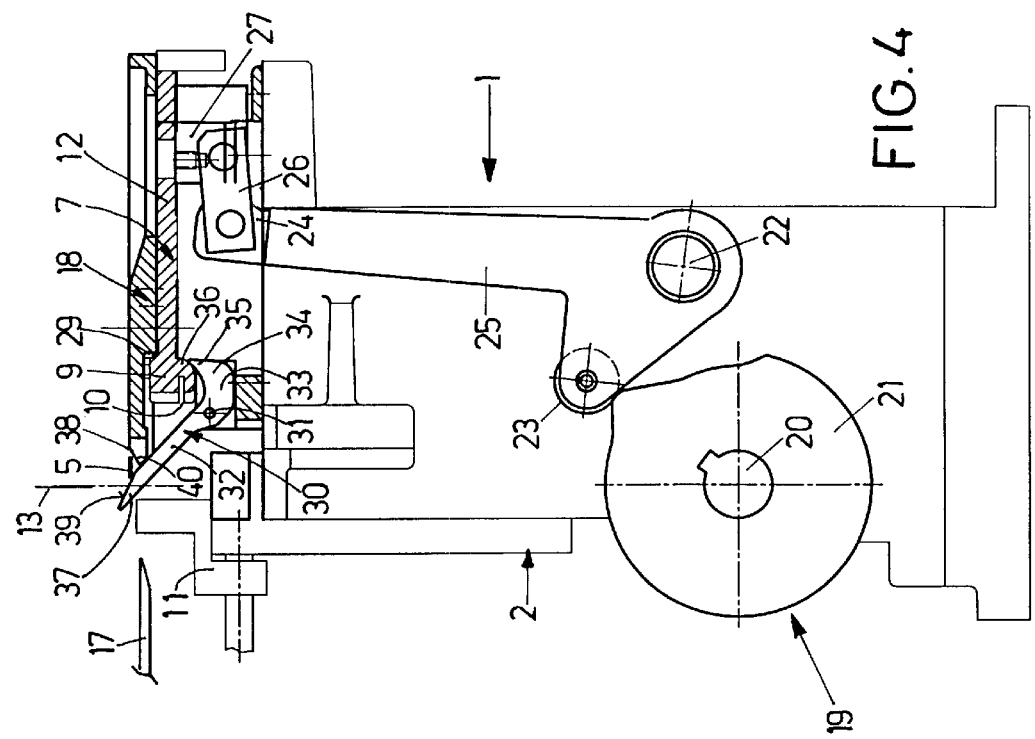
FIGS. 3 and 4, respectively, are illustrations by analogy to FIGS. 1 and 2, respectively, with the ejector in the position of ejection.
Figure 3:
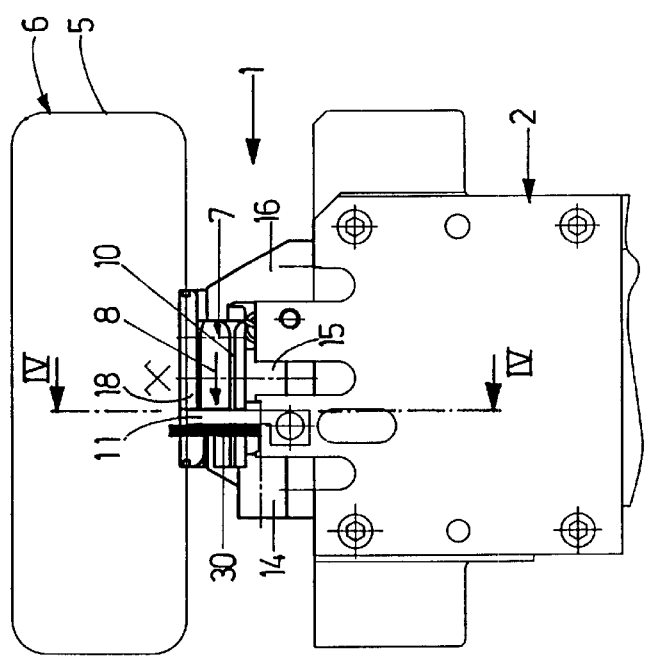

The annexed FIGS. 1 to 4 illustrate only those components of the welding head 1 which are relevant to the present invention. Fundamentally, it is provided with a casing 2 (only roughly outlined), in which structural parts of functional relevance are lodged and guided in known manner. Ranking among these are in particular the clamping jaws 14, 15 (seen only partially) for actuation of the looping strap sections 3, 4, led through the welding head 1, of the looping strap designated in its entirety by 5. The looping strap 5 is delivered via an insertion arrangement (not shown) from a strap supply and led through the welding head 1 into a strap guiding frame (not shown) where the looping strap 5 is guided in the form of a loose loop 6 around the stack to be looped until the leading end of the strap section 3 again arrives in the welding head 1. In this regard, the structure of the welding head 1 constitutes prior art as described for instance in DE 297 16 896 U1 mentioned at the outset.

A strap guide 7 is primarily responsible for the passage of the looping strap 5 through the welding head 1, its head 9 extending in the direction of passage 8 and having a laterally open guiding slot 10 for the looping strap 5. Upon insertion through the welding head 1, the looping strap 5 runs in this guiding slot 10. A guiding finger 11 (FIG. 2) before the open side of the guiding slot 10 in the head 9 of the strap guide 7 works as a safeguard against the looping strap 5 coming out laterally. For the support of the head 9, the strap guide 7 has a flat shank 12 which is displaceably guided in a guide groove (not shown) in the casing 2 transversely of the looping plane 13. A cutting jaw 16 is provided in addition to the clamping jaws 14, 15, by means of which the strap loop 6 can be severed from the inserted supply of strap after the strap sections 3, 4 have been welded together.

The actual welding set consists in a welding tongue 17 to be slipped laterally in between the two looping strap sections 3, 4. This takes place after the loop 6 has been formed and tautened, the strap guide 7 being pushed out in the opposite direction synchronously of the insertion of the welding tongue 17 between the looping strap sections 3, 4. In this way the strap section 4 which runs in the guiding slot 10 is released and can be pressed by the clamping jaw 15 against the upper strap section 3 with the welding tongue 17 lying in between. The pressure plate 18, which constitutes the upper end of the welding head 1, serves as an opposite bearing; it is displaceably supported on the casing 2 in parallel to the strap guide 7.

Time-controlled actuation of the individual functional components of the welding head 1 takes place via a cam control 19, only the cam shaft 19 and a cam disk 21 of which being illustrated in FIGS. 2 and 4. The cam disk 21 serves for actuation of the strap guide 7 and the pressure plate 18 during the lateral swing-out motion in the welding process and thereafter. The cam disk 21 faces a one-armed transmission lever 25 which, by means of a cam roller 23, follows the curve of the cam disk 21 and is mounted pivotally about an axis 22. Via an intermediate connecting rod 26, the free end 24 of the transmission lever 25 is articulated to a fishplate 27 on the rear end of the shank 12 of the strap guide 7. The cam control 19 and the transmission lever 25 serve for direct actuation of the strap guide 7 and indirect actuation of the pressure plate 18. For the pressure plate 18, after passing through a basic deflection length 28 of the strap guide 7, is taken along in the direction of deflection, and thus also moved out laterally, by the head 9 of the strap guide 7 stopping on a shoulder 29 on the underside of the pressure plate 18.

Gist of the present invention is an ejection lever 30 which is disposed underneath, and flanking, the strap guide 7 and which is double-armed and pivotal about a pivot axis 31 which is parallel to the direction of passage 8 of the looping strap 5 and laterally displaced therefrom. The free end 37 of the arm 32, which is directed towards the looping plane 13, is the actual ejector, the normal position of which (FIGS. 1, 2) is substantially horizontal. The driving end 34 of the second arm 33 of the ejection lever 30 is bent in the shape of a hook into the motion travel of the strap guide 7, thus being actuated by the strap guide 7 during the motion of disengagement thereof. Thus, also the ejection lever 30 is indirectly drivable via the cam control 19 in a manner still to be described. As seen in FIG. 1, the ejection lever 30 is located by the side of the guide finger 11 referred to the direction of passage 8.

The mode of operation of the welding head 1 during the welding process and afterwards is explained as follows:

In the normal position, seen in FIGS. 1 and 2, of the welding head 1, the looping strap 5 is inserted through the guiding slot 10 of the strap guide 7 and again returned into the welding head 1, forming a loose loop 6 around the product to be looped. The strap sections 3, 4 are fixed by the clamping jaws 14, 15, after which the strap guide 7, by the aid of the cam control 19, is deflected by the basic deflection length 28 to the right referred to FIG. 2. The pressure plate 18 and the ejection lever 30 remain in the normal position seen in FIGS. 1 and 2. The welding tongue 17—also driven via a cam control 19—moves between the two strap sections 3, 4, melts them and is then retracted into the normal position seen in FIG. 2. Directly afterwards, the strap sections 3, 4 are pressed one upon the other and from below against the pressure plate 18 by the aid of the clamping jaw 15. Thus the closed loop is formed and fixed between the strap sections 3, 4. Upon further rotation of the cam disk 21, the cam roller 23 arrives on the nose 35 of the cam disk 21, whereby the transmission lever 25 is further pivoted clockwise referred to FIGS. 2 and 4. Thus, the strap guide 7 is moved out beyond the basic deflection length 28, taking along the pressure plate 18 into its position of disengagement laterally outside the looping plane 13. In this case, the lower rear edge 36 of the head 9 of the strap guide 7 stops on the driving end 34, bent inwards, of the ejection lever 30, whereby the ejection lever 30 is pivoted clockwise about its pivot axis 31. Thus, the ejection lever 30 lifts the welded strap 5 upwards out of the welding head 1, whereby the looped package can be carried off the work table of the looping machine without any problems.

The release of the looping strap 5 is still further supported by the fact that the free end 37 of the arm 32 as well as the front end 38, directed towards the looping plane 13, of the pressure plate 18 are provided with an upward stripping slope 39, 40. During the lifting motion, the looping strap 5 will slide off the stripping slope 39 of the ejection lever 30 and place itself on the stripping slope 40 of the pressure plate 18, as seen in FIG. 4. Upon return of the ejection lever 30 and the pressure plate 18 into their normal position, the stripping slope 40 the pressure plate 18 backs up the looping strap 5 and lifts the portion where the loop is closed over the pressure plate 18.

Concluding it can be said that the ejection lever 40 together with its indirect pivot drive via the cam control 19 forms an ejector of mechanical operation which is integrated into the welding head 1, lifting the welded looping strap 5 out of the welding head 1.

What is claimed is:

1. A welding head for a looping machine, comprising:

a strap guide (7), slidably guided in the welding head (1), for passing a looping strap (5) through the welding head (1) and for releasing the looping strap (5) from the welding head (1) by a lateral slide motion;

a strap fixing element (14) for holding lapping strap sections (3, 4) which are to be welded together;

a welding set (17) for melting the strap sections (3, 4) which are to be welded together;

a pressing arrangement (15) for joining the melted strap sections (3, 4) which are to be welded together; and a separate ejection lever (30) for lifting the welded looping strap (5) out of the welding head (1), which ejection lever (30) is integrated into the welding head (1) and mechanically operated by said lateral slide motion of said strap guide (7).

2. A welding head according to claim 1, wherein the ejection lever (30) is mounted laterally of a looping plane (13) and is pivotal about a pivot axis (31) which extends in parallel to a direction of passage (8) of the looping strap (5) through the welding head (1), and a free end (37) of which backs up the looping strap (5) when it is lifted out of the welding head (1).

3. A welding head according to claim 2, wherein the ejection lever (30) is actuated via a cam control (19) of the welding head (1).

4. A welding head according to claim 1, wherein the ejector (30) is actuated indirectly via a drive of the strap guide (7).

5. A welding head according to claim 4, wherein the ejection lever (30) is a double-armed lever flanking the strap guide (7) comprising a free end (37) and a driving end (34) opposite to the free end (37), the ejection lever (30) being actuated by the strap guide (7) at said driving end (37) for pivoting actuation.

6. A welding head according to claim 5, wherein the driving end (34) is bent in the form of a hook into a motion path of the strap guide (7).

7. A welding head for a looping machine, comprising:

a strap guide (7) for passing the looping strap (5) through the welding head (1);

a strap fixing element (14) for holding the lapping strap sections (3, 4) which are to be welded together;

a welding set (17) for melting the looping strap sections (3, 4) which are to be welded together;

a pressing arrangement for joining the melted strap sections (3, 4) which are to be welded together;

a mechanically operated ejector (30) which is integrated in the welding head (1) for lifting the welded looping strap (5) out of the welding head (1); and a pressure plate (18) which limits the welding head (1) upwards and is laterally deflectable for lifting the welded looping strap (5), wherein the edge (38), facing the. looping strap (5), of the pressure plate (18) or free end (37) of the ejector (30) forms a stripping slope (39, 40).

8. A welding head according to claim 7, wherein the ejection lever (30) is mounted laterally of a looping plane (13) and is pivotal about a pivot axis (31) which extends in parallel to a direction of passage (8) of the looping strap (5) through the welding head (1), and a free end (37) of which backs up the looping strap (5) when it is lifted out of the welding head (1).

9. A welding head according to claim 8, wherein the ejection lever (30) is actuated via a cam control (19) of the welding head (1).

10. A welding head according to claim 7, wherein the ejector (30) is actuated indirectly via a drive of the strap guide (7).

11. A welding head according to claim 10, wherein the ejection lever (30) is a double-armed lever flanking the strap guide (7) comprising a free end (37) and a driving end (34) opposite to the free end (37), the ejection lever (30) being actuated by the strap guide (7) at said driving end (37) for pivoting actuation.

12. A welding head according to claim 11, wherein the driving end (34) is bent in the form of a hook into a motion path of the strap guide (7).

* * * * *